United States Patent

[11] 3,550,889

| [72] | Inventor | William F. Donovan<br>Harford, Md. |
|---|---|---|
| [21] | Appl. No. | 779,168 |
| [22] | Filed | Nov. 26, 1968 |
| [45] | Patented | Dec. 29, 1970 |
| [73] | Assignee | The United States of America as represented by the Secretary of the Army |

[54] QUICK RELEASE LOCATING FIXTURE
1 Claim, 6 Drawing Figs.

[52] U.S. Cl.................................................. 248/176,
89/1.7, 248/309, 308/61
[51] Int. Cl...................................................... F41f 3/02
[50] Field of Search........................................... 248/74,
309, 246, 42, 62, 251, 176; 85/32; 308/61; 89/1.7,
1.701, 1.702, 1.703, 1.704, 1.705

[56] References Cited
UNITED STATES PATENTS

| 2,066,541 | 1/1937 | Schenk.......................... | (85/32UX) |
| 2,301,885 | 11/1942 | Laehr............................. | 248/42 |
| 2,645,439 | 7/1953 | Gauthier........................ | 248/42 |
| 2,765,999 | 10/1956 | Baker............................. | 248/246X |
| 3,071,338 | 1/1963 | Kaufman et al................ | 248/226X |

FOREIGN PATENTS

| 508,587 | 10/1920 | France........................... | 248/74 |

Primary Examiner—Roy D. Frazier
Assistant Examiner—J. Franklin Foss
Attorneys—Harry M. Saragovitz, Edward J. Kelly, Herbert Berl and Robert P. Gibson ABSTRACT: A cylindrical object is held in a selected position and then quickly released. The fixture for holding the object is pivotably mounted on a stand. The fixture has an opening therein which is larger than the object and may be noncircular (elliptical for example). When the fixture is pivoted in one direction it presents contacting surfaces to the surface of the object to be held. The contacting surfaces are preferably contoured to mate with each other. When the fixture is pivoted in another direction the mating surfaces disengage and the fixture presents an enlarged opening adjacent to the object. This permits easy removal of the object from the fixture.

PATENTED DEC 29 1970
3,550,889
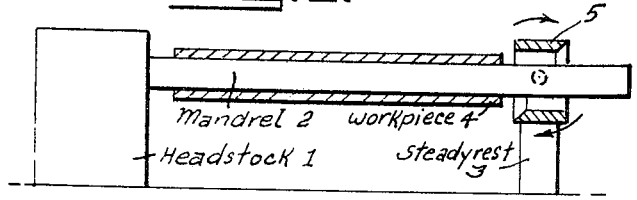
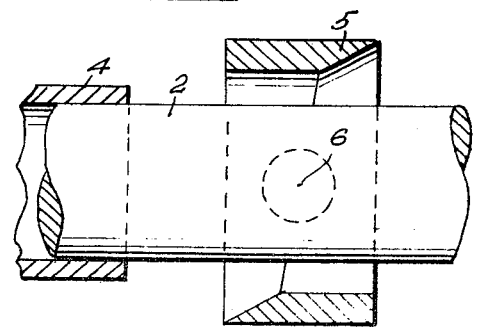
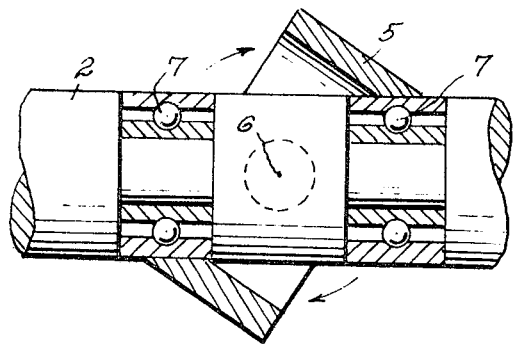
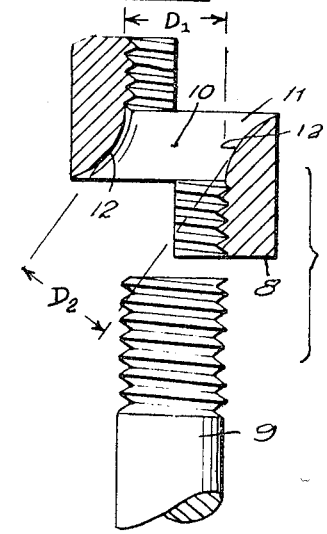
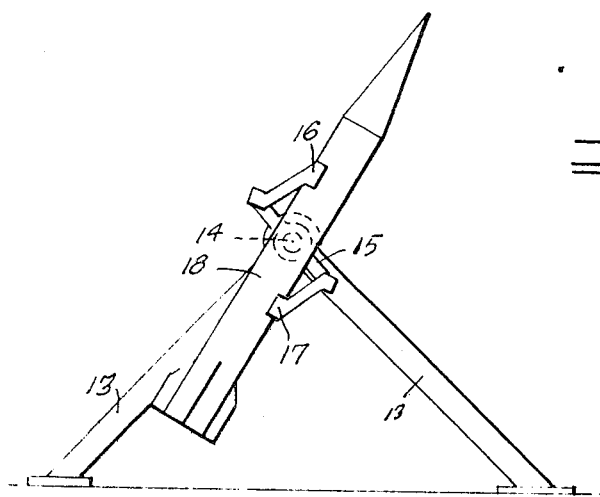
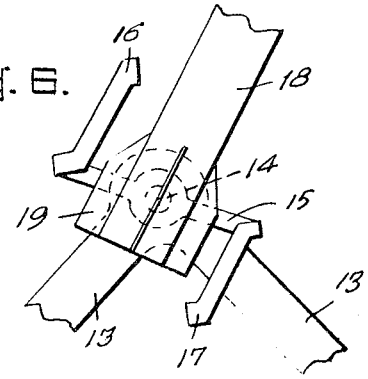
INVENTOR,
William F. Donovan
BY: Harry M. Saragovitz,
Edward J. Kelly &
R. P. Gibson
ATTORNEYS.

QUICK RELEASE LOCATING FIXTURE

The invention described herein may be manufactured, used, and licensed by or for the Government for governmental purposes without the payment to me of any royalty thereon.

BRIEF SUMMARY

In many instances it is desirable to secure a cylindrical object in a given position for a period of time. Then, quickly, the object should be released. An example is encountered in the use of turning latches where a mandrel is chucked-up, a steady rest is quickly secured to the mandrel to prevent wobbling, vibration, or such, and the mandrel is set spinning. When the mandrel is stopped the steady rest permits quick removal. The present invention may take the form of such a steady rest.

Another example is a rocket, poised for launching and secured by a fixture as disclosed herein. With a flip of the wrist the fixture is swung clear of the rocket and the rocket may speed away, unimpeded by the supporting fixture.

Other examples are described hereinafter and still others will become apparent as the description proceeds.

IN THE DRAWING

FIG. 1 is a diagrammatic representation of one embodiment of the invention.

FIGS. 2 and 3 are detail views of parts of the embodiment of FIG. 1.

FIG. 4 is a diagrammatic illustration of a modification.

FIGS. 5 and 6 are diagrammatic illustrations of another modification.

Typically, a headstock drive 1 rotates a piece being worked on or a mandrel 2, held steady by steady rest 3. Work may be performed on the piece being worked on or on a cylindrical sleeve 4 surrounding the mandrel. A jig or locating fixture 5 may be pivoted at 6. As illustrated in FIG. 2, fixture 5 has an internal diameter considerably greater than the external diameter of member 2. Therefore, when fixture 5 is pivoted to a position in a plane normal to the axis of member 2, there is a considerable clearance between member 2 and fixture 5. This permits member 2 to be easily passed into or out from fixture 5, or permits a sleeve 4 to be easily slid onto or off from member 2.

FIG. 3 illustrates the parts after fixture 5 has been pivoted about axis 6 until the upper and lower edges came into contact with member 2. If desired, ball bearings 7 may be used on member 2 at the areas where fixture 5 contacts member 2. Fixture 5 may be beveled as illustrated if desired. Also, the opening in fixture 5 may be some shape other than round, if desired, such as elliptical. These possible features can be used to give better mating surfaces at the points of contact between fixture 5 and member 2 as will be obvious to those skilled in the art.

FIG. 4 illustrates the invention in the form of a quick action clamp 8 to receive a threaded rod or bolt 9. Clamp 8 may be pivotally mounted to pivot about an axis 10. Clamp 8 may be likened to two halves of a nut, each spaced offset longitudinally with respect to the other, and connected together at 11. The diameter of the threaded rod 9 is equal to $D_1$. $D_1$ is also equal to the inner diameter of clamp 8, taken in a plane normal to the axis of the threaded rod 9 and clamp 8. Clamp 8 is chamfered at 12 to a diameter $D_2$, greater than diameter $D_1$. The axis of the opening having the diameter $D_2$ is offset angularly with respect to the axis of the opening having the diameter $D_1$. Therefore, when the parts are in the position illustrated in FIG. 4 the threads engage and rod 9 is secured by clamp 8. To release the rod clamp 8 is quickly pivoted about axis 10 until the chamfered edges 12 present an opening, having a diameter $D_2$, in the plane normal to the axis of rod 9. Rod 9 then slides freely out of clamp 8.

FIGS. 5 and 6 illustrate the invention applied to a rocket launcher. Supporting frame 13 has trunnions 14 with bracket 15 pivotally connected thereto. A connector attached to each end and extending at substantially right angles to bracket 15 and arms 16 and 17 attached to the opposite ends of the connectors. Arms 16 and 17 being adapted to frictionally engage rocket 18. The center of gravity of the rocket is below trunnions 14 and the rocket hangs in bracket 15 due to frictional engagement between the rocket casing and arms 16 and 17.

In FIG. 6 bracket 15 was quickly rotated to disengage arms 16 and 17 from the rocket at the split second at launch time. This allows the rocket, and projections such as fins 19, to sail through bracket 15 between arms 16 and 17. Here, again, the diameters of the components involved bear a relationship to one another similar to that described in regard to FIG. 4.

I claim:

1. Quick-release supporting apparatus comprising a supporting frame, trunnion pivotal supporting means on said frame, a pivotally mounted bracket arm having a pair of connectors attached at opposite ends and extending at substantially right angles to said bracket arm and substantially parallel to said trunnion pivot axis, a pair of arms attached to the ends of said connectors and extending substantially parallel to each other but in opposite directions and substantially at right angles from said bracket arm, each member of said pair of arms being contoured to engage and mate with a casing, such as a rocket, to support same when set in one position and to quickly release said casing when pivoted to a second position.